(12) United States Patent
Frank

(10) Patent No.: US 12,283,981 B2
(45) Date of Patent: *Apr. 22, 2025

(54) METHOD AND APPARATUS FOR ADJUSTING FOR HIGHER ORDER INTERMODULATION PRODUCTS CO-LOCATED WITH LOWER ORDER INTERMODULATION PRODUCTS

(71) Applicant: Lenovo (Singapore) Pte. Ltd., New Tech Park (SG)

(72) Inventor: Colin Frank, Park Ridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 470 days.

This patent is subject to a terminal disclaimer.

(21) Appl. No.: 17/538,690

(22) Filed: Nov. 30, 2021

(65) Prior Publication Data

US 2022/0094378 A1    Mar. 24, 2022

Related U.S. Application Data

(63) Continuation of application No. 16/245,250, filed on Jan. 10, 2019, now Pat. No. 11,190,226.
(Continued)

(51) Int. Cl.
| | |
|---|---|
| H04B 1/10 | (2006.01) |
| H04L 5/00 | (2006.01) |
| H04W 72/23 | (2023.01) |

(52) U.S. Cl.
CPC .......... *H04B 1/1027* (2013.01); *H04B 1/109* (2013.01); *H04L 5/0066* (2013.01); *H04L 5/0098* (2013.01); *H04W 72/23* (2023.01)

(58) Field of Classification Search
CPC .. H04L 5/0066; H04L 5/0098; H04L 72/1289
See application file for complete search history.

(56) References Cited

U.S. PATENT DOCUMENTS

| | | | |
|---|---|---|---|
| 8,861,413 | B2 | 10/2014 | Immonen et al. |
| 9,859,947 | B2 | 1/2018 | Lee et al. |

(Continued)

FOREIGN PATENT DOCUMENTS

| | | |
|---|---|---|
| CN | 111566978 A | 8/2020 |
| CN | 111566978 B | 6/2024 |

(Continued)

OTHER PUBLICATIONS

European Patent Search Report for EP Appln. No. 23193190.8, Lenovo (Singapore) Pte. Ltd., mailing date—Nov. 22, 2023.
(Continued)

*Primary Examiner* — Kenny S Lin
*Assistant Examiner* — Rodrick Mak
(74) *Attorney, Agent, or Firm* — FIG. 1 Patents

(57) ABSTRACT

A method and apparatus are provided. an indication of a first uplink resource allocation of resource blocks for a transmission on a first carrier, and an indication of a second uplink resource allocation of resource blocks for a transmission on a second carrier are received. An indication of a downlink allocation for receiving a downlink signal is further received. A higher order intermodulation product, which is co-located with a lower order intermodulation product for the first and second allocations resulting from any respective higher order and lower order transceiver nonlinearities is identified. A determination is then made as to whether the co-located higher order intermodulation products have a region of overlap with the downlink allocation. When the co-located higher order intermodulation products have a region of overlap with the downlink allocation, adjustments in the operation are made to account for the overlap of the higher order intermodulation product and the downlink allocation.

22 Claims, 4 Drawing Sheets

Related U.S. Application Data

(60) Provisional application No. 62/617,116, filed on Jan. 12, 2018.

(56) References Cited

U.S. PATENT DOCUMENTS

| | | | |
|---|---|---|---|
| 2016/0095134 A1* | 3/2016 | Chen | H04W 72/23 370/336 |
| 2017/0054535 A1 | 2/2017 | Lim et al. | |
| 2017/0318587 A1 | 11/2017 | Lim et al. | |
| 2019/0222242 A1 | 7/2019 | Frank | |
| 2024/0129946 A1* | 4/2024 | Kwok | H04W 72/541 |

FOREIGN PATENT DOCUMENTS

| | | |
|---|---|---|
| CN | 118590202 A | 9/2024 |
| EP | 3738265 A1 | 11/2020 |
| EP | 3738265 B1 | 10/2023 |
| EP | 4254810 A2 | 10/2023 |
| KR | 102701101 B1 | 8/2024 |
| WO | 2019138293 A1 | 7/2019 |

OTHER PUBLICATIONS

Frank, Colin , "Pursuant to MPEP § 2001.06(b) the applicant brings the following co-pending application to the Examiner's attention:", U.S. Appl. No. 62/617,116, Jan. 12, 2018, 24 pages.

* cited by examiner

METHOD AND APPARATUS FOR ADJUSTING FOR HIGHER ORDER INTERMODULATION PRODUCTS CO-LOCATED WITH LOWER ORDER INTERMODULATION PRODUCTS

FIELD OF THE INVENTION

The present disclosure is directed to a method and apparatus for adjusting for higher intermodulation products co-located with lower order intermodulation products, such as defining adjustments for reference sensitivity power level requirements in response to considering higher order intermodulation products, which overlaps one of the user equipment downlink allocations.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In order to support greater data throughputs, service providers have been increasingly looking at techniques which extend the available bandwidth that is allowed to be used by a particular user within the system. At least a couple of bandwidth extending techniques include the use of carrier aggregation and/or dual carrier, where multiple frequency bands are selected to operate together. For example, by utilizing more than one carrier through carrier aggregation it may be possible to increase the overall transmission bandwidth associated with a particular data channel and correspondingly enhance the data capacity of that channel. Additionally and/or alternatively, a dual or multiple carrier approach can allow two or more spectrum allocations to be paired and/or used in parallel, which similarly can support the ability of enhanced data throughput.

However, the use of data resources from multiple frequency bands and/or spectrum allocations together in one or more uplinks has the potential to produce various higher and lower order intermodulation products from a mixing of these signals due to non-linearities in the transceiver that can couple back in through the antenna and possibly interfere with signaling present on a downlink channel. In some cases, the intermodulation products resulting from the multiple uplink allocations can have a wider bandwidth, than the respective individual original uplinks, which can combine and extend to interfere with the frequencies associated with the downlink allocation. In at least some instances, a higher order intermodulation product may overlap with a downlink allocation, even in instances where a lower order intermodulation product does not.

The present inventor has recognized that it may be beneficial to consider accommodations for instances in which higher order intermodulation products may overlap with a downlink allocation, including instances in which the lower order intermodulation products do not overlap with the downlink allocation. For example, it may be beneficial for the downlink allocation to be scheduled so as to avoid such concerns, or for transceiver testing requirements to be relaxed when such a condition is detected as being present or possible.

SUMMARY

The present application provides a method in a wireless communication device. The method includes receiving an indication of a first uplink resource allocation of resource blocks for a transmission on a first carrier, and receiving an indication of a second uplink resource allocation of resource blocks for a transmission on a second carrier. An indication of a downlink allocation for receiving a downlink signal is further received. A higher order intermodulation product, which is co-located with a lower order intermodulation product for the first and second allocations resulting from any respective higher order and lower order transceiver nonlinearities is identified. A determination is then made as to whether the co-located higher order intermodulation products have a region of overlap with the downlink allocation. When the co-located higher order intermodulation products have a region of overlap with the downlink allocation, the reference sensitivity requirement in the region of overlap between the higher order intermodulation product and the downlink allocation is adjusted.

In at least some embodiments, determining whether the co-located higher order intermodulation products have a region of overlap with the downlink allocation includes instances where the lower order intermodulation products do not have a region of overlap with the downlink allocation.

In some instances, the transmission on the first carrier and the transmission on the second carrier support carrier aggregation, which can include a combination of different spectrum bands to form a larger bandwidth channel to transmit data.

In some instances, the transmission on the first carrier and the transmission on the second carrier can support dual carrier operation.

The present application further provides a user equipment in a communication network. The user equipment includes a transceiver that sends and receives signals between the user equipment and a network entity of the communication network including receiving an indication of a first uplink resource allocation of resource blocks for a transmission on a first carrier, receiving an indication of a second uplink resource allocation of resource blocks for a transmission on a second carrier, and receiving an indication of a downlink allocation for receiving a downlink signal. The user equipment further includes a controller that identifies a higher order intermodulation product, which is co-located with a lower order intermodulation product for the first and second allocations resulting from any respective higher order and lower order transceiver nonlinearities, and determines whether the co-located higher order intermodulation products have a region of overlap with the downlink allocation. When the co-located higher order intermodulation products have a region of overlap with the downlink allocation, the controller adjusts the reference sensitivity requirement in the region of overlap between the higher order intermodulation product and the downlink allocation.

The present application still further provides a method in a network entity. The method includes selecting a first uplink resource allocation of resource blocks for a transceiver of a user equipment on a first carrier, and selecting a second uplink resource allocation of resource blocks for the transceiver of the user equipment on a second carrier. A higher order intermodulation product, which is co-located with a lower order intermodulation product for the first and second uplink resource allocations resulting from any respective higher order and lower order transceiver nonlinearities in the transceiver of the user equipment is then identified. A downlink allocation for receiving a downlink signal is then selected, such that the selected downlink allocation avoids overlapping with any higher order intermodulation products, which is identified as being co-located with a lower order intermodulation product for the first and second uplink resource allocations. An indication of the first uplink resource allocation, the second uplink resource allocation, and the downlink allocation is then transmitted to the user equipment for use in communicating with the network entity.

Further yet, the present application provides a network entity, which includes a controller that selects a first uplink resource allocation of resource blocks for a transceiver of a user equipment on a first carrier, and selects a second uplink resource allocation of resource blocks for the transceiver of the user equipment on a second carrier. The controller further identifies a higher order intermodulation product, which is co-located with a lower order intermodulation product for the first and second uplink resource allocations resulting from any respective higher order and lower order transceiver nonlinearities, and selects a downlink allocation for receiving a downlink signal, such that the selected downlink allocation avoids overlapping with any higher order intermodulation products, which is identified as being co-located with a lower order intermodulation product for the first and second uplink resource allocations. The network entity further includes a transceiver that sends and receives signals between the user equipment and the network entity including transmitting an indication of the first uplink resource allocation, the second uplink resource allocation, and the downlink allocation to the user equipment for use in communicating with the network entity.

These and other features, and advantages of the present application are evident from the following description of one or more preferred embodiments, with reference to the accompanying drawings.

DETAILED DESCRIPTION OF THE PREFERRED EMBODIMENT(S)

Figure 1:
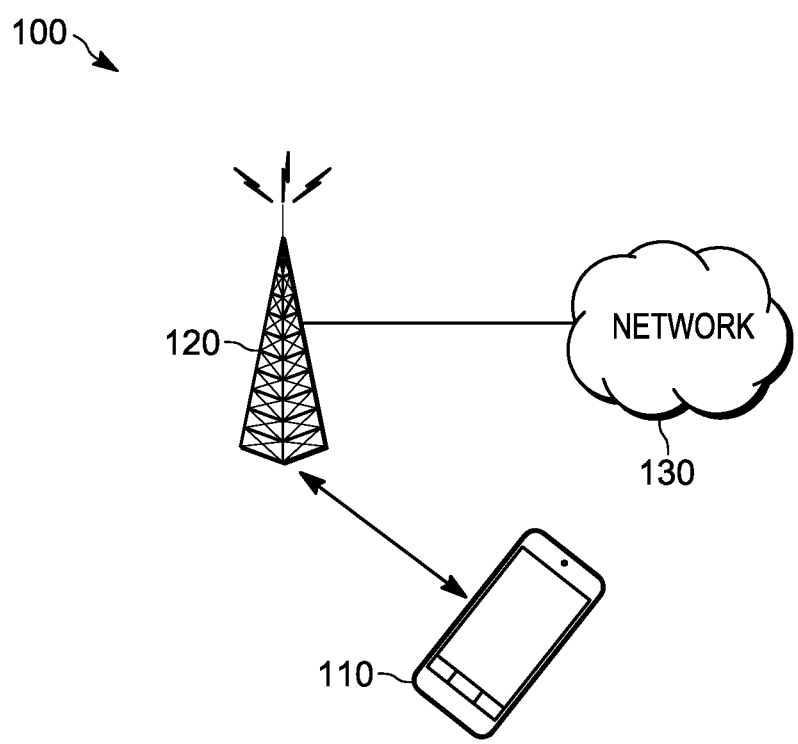
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for adjusting for higher order intermodulation products co-located with lower order intermodulation products.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

Recent co-existence studies for NSA NR have considered harmonics and intermodulation (IM) products up to at least 5th order to determine if they interfere with the UE downlink carrier or with other bands. One such example includes 3GPP TR 37.863-01-01 V0.3.0 (2017-11), entitled Dual connectivity (DC) band combinations of LTE 1DL/1UL+ one NR band. At least one aspect which may be missing from this and other studies is the impact of higher order IM products which are co-located with lower order IM products. While these higher order IM's have less power than the lower order IM's with which they are co-located, they are wider and therefore may overlap the UE downlink or other bands even when the lower-order IM's do not. Furthermore, the higher order IM products which are co located with the lower order IM's may have more power than the higher order IM products which are not co-located with lower order IM's. As a result, if the higher order MI products which are not co-located with lower order IM's have sufficient power to interfere with the downlink or with other bands, then it follows that the same may be true for the higher order IM products which are co-located with the lower order IM products.

It can be noted that these co-located higher order IM's are implicitly addressed in the TS 36.101 spurious emission exceptions in the form of expanded regions for harmonic exceptions due to spectral "spreading". The higher order co-located IM's are also implicitly addressed in the harmonic Refsens exceptions defined for the case when the harmonic does not overlap the UE downlink allocation but is adjacent to it.

In accordance with at least one possible embodiment, the present disclosure includes defining the reference sensitivity power level (Refsens) relaxations or no Refens requirement for the user equipment (UE) in the case that a higher order intermodulation product of multiple uplink carriers is co-located with a lower order intermodulation product and the higher order intermodulation product overlaps one of the UE downlink allocations. Previously, the 3GPP RAN4 specification has defined Refsens relaxations or no Refsens requirement in the case that intermodulation products from multiple carriers fall on the UE's downlink allocation. However, RAN4 has ignored the issue of higher order intermodulation products which are co-located with lower order intermodulation products. While the higher order modulation products have less power, in general, than the lower order intermodulation products, these higher order modulation products have wider bandwidth and thus can impinge on the UE downlink allocation even when the lower order IM product does not. In the case that the lower order IM overlaps the UE's downlink, the region of overlap will be extended by the co-located higher order IM product.

Historically, Refsens relaxations or no Refsens requirement may have generally been provided in the case that intermodulation products interfere with the UE's downlink receiver. However, they generally have failed to address instances, in which higher order intermodulation products are co-located with lower order intermodulation products and the higher order intermodulation products interfere with the UE's downlink receiver while the co-located lower order IM product does not. In the case that the lower order IM overlaps the UE's downlink, the region of overlap will be extended by the co-located higher order IM product. Examples of this issue can be shown by considering the fourth order intermodulation products that are co-located with the second order intermodulation products, and similarly, the fifth order intermodulation products that are co-located with third order intermodulation products. It can be noted that only 'even' higher order intermodulation products are co-located with 'even' lower order intermodulation products, and only 'odd' higher order intermodulation products are co-located with 'odd' lower order intermodulation products.

According to a possible embodiment, it may be beneficial to identify the higher order intermodulation products which are co-located with lower order intermodulation products and which interfere with the UE's downlink allocation. For these higher-order intermodulation products co-located with lower order intermodulation products, it is may be beneficial to define Refsens relaxations or no Refsens requirement in the case that the higher order IM overlaps the UE's downlink allocation while the lower order IM does not. In the case that the lower order IM overlaps the UE's downlink, the region of overlap will be extended by the higher order IM and either Refsens relaxation or no Refsens requirement could be defined for this extended overlap region.

The third, fourth, and fifth powers of a two carrier signal of the form $$a_1(t)\cos(\omega_1 t)+a_2(t)\cos(\omega_2 t)$$

can be expanded, where $a_1(t)$ denotes the modulation on the first carrier at $f_1=\omega_1/2\pi$, which has bandwidth $W_1$ and $a_2(t)$ denotes the modulation on the second carrier at $f_2=\omega_2/2\pi$, which has bandwidth $W_2$.

Third Order Nonlinearity Intermodulation Products

Correspondingly, the two carrier third-order nonlinearity can be represented as:

$$(a_1(t)\cos(\omega_1 t)+a_2(t)\cos(\omega_2 t))^3$$

which expands, as follows:

$$(a_1(t)\cos(\omega_1(t)+a_2(t)\cos(\omega_2 t))^3=0.25(a_1(t))^3\cos(3\omega_1 t)+0.25(a_2(t))^3\cos(3\omega_2 t)+0.75(a_1(t))^2 a_2(t)\cos((2\omega_1-\omega_2)t)+0.75a_1(t)(a_2(t))^2\cos((\omega_1-2\omega_2)t)+0.75(a_1(t))^2 a_2(t)\cos((2\omega_1+\omega_2)t)+0.75a_1(t)(a_2(t))^2\cos((\omega_1+2\omega_2)t)+(0.75(a_1(t))^3+1.5a_1(t)(a_2(t))^2)\cos(\omega_1 t)+(0.75(a_2(t))^3+1.5(a_1(t))^2 a_2(t))\cos(\omega_2 t)$$

The harmonics and IM products which result from the expansion can be found in Table 1, below. The terms noted with an asterisk, namely IM #'s 7-10, have typically not been included in co-existence studies. However, it should be noted that multiplicative coefficients for the noted terms are at least as large as those for the IM terms normally included for the third order non-linearity.

TABLE 1

IM Products and Harmonics due to $3^{nd}$ Order Non-linearity

| IM # | Center Frequency | IM Bandwidth | Multiplicative Coefficient |
|---|---|---|---|
| 1 | $3*f_1$ | $3*W_1$ | 0.25 |
| 2 | $3*f_2$ | $3*W_2$ | 0.25 |
| 3 | $\|2*f_1 - f_2\|$ | $2*W_1 + W_2$ | 0.75 |
| 4 | $\|f_1 - 2*f_2\|$ | $W_1 + 2*W_2$ | 0.75 |
| 5 | $2*f_1 + f_2$ | $2*W_1 + W_2$ | 0.75 |
| 6 | $f_1 + 2*f_2$ | $W_1 + 2*W_2$ | 0.75 |
| 7* | $f_1$ | $3*W_1$ | 0.75 |
| 8* | $f_1$ | $W_1 + 2*W_2$ | 1.5 |
| 9* | $f_2$ | $3*W_2$ | 0.75 |
| 10* | $f_2$ | $2*W_1 + W_2$ | 1.5 |

The IM products 7 and 9 are the source of adjacent channel leakage in single carrier operation. The IM products 8 and 10 occur in dual-carrier operation and unless $W_1$ and $W_2$ are equal, one of these IM products will be wider than the corresponding IM for single carrier operation.

If the multiplicative coefficient of each term is ignored, Table 1 can be simplified slightly as in Table 1 a below.

TABLE 1a

IM Products and Harmonics due to $3^{nd}$ Order Non-linearity

| IM # | Center Frequency | IM Bandwidth |
|---|---|---|
| 1 | $3*f_1$ | $3*W_1$ |
| 2 | $3*f_2$ | $3*W_2$ |
| 3 | $\|2*f_1 - f_2\|$ | $2*W_1 + W_2$ |
| 4 | $\|f_1 - 2*f_2\|$ | $W_1 + 2*W_2$ |
| 5 | $2*f_1 + f_2$ | $2*W_1 + W_2$ |
| 6 | $f_1 + 2*f_2$ | $W_1 + 2*W_2$ |
| 7* | $f_1$ | $\max(3*W_1, W_1 + 2*W_2)$ |
| 8* | $f_2$ | $\max(3*W_2, W_2 + 2*W_1)$ |

Fourth Order Nonlinearity Intermodulation Products

The two carrier fourth-order nonlinearity can be represented as:

$$(a_1(t)\cos(\omega_1 t)+a_2(t)\cos(\omega_2 t))^4$$

which expands, as follows:

$$(a_1(t)\cos(\omega_1 t) + a_2(t)\cos(\omega_2 t))^4$$

$$= \left(\frac{1}{2}a_1(t)(\exp(j\omega_1 t) + \exp(-j\omega_1 t)) + \frac{1}{2}a_2(t)(\exp(j\omega_2 t) + \exp(-j\omega_2 t))\right)^4$$

$$= \frac{1}{16}\sum_{i=0}^{4}\sum_{j=0}^{4-i}\sum_{k=0}^{4-i-j}\binom{4}{ijk}(a_1(t)\exp(j\omega_1 t))^i(a_1(t)\exp(-j\omega_1 t))^j$$

$$(a_2(t)\exp(j\omega_2 t))^k(a_2(t)\exp(-j\omega_2 t))^{4-i-j-k}$$

$$= \frac{1}{16}\sum_{i=0}^{4}\sum_{j=0}^{4-i}\sum_{k=0}^{4-i-j}\binom{4}{ijk}(a_1(t))^{i+j}(a_2(t))^{4-i-j}\exp(j\omega_1 t)^i$$

$$\exp(-j\omega_1 t)^j \exp(j\omega_2 t)^k \exp(-j\omega_2 t)^{4-i-j-k}$$

$$= \frac{1}{16}\sum_{i=0}^{4}\sum_{j=0}^{4-i}\sum_{k=0}^{4-i-j}\binom{4}{ijk}(a_1(t))^{i+j}(a_2(t))^{4-i-j}\exp(j\omega_1 t)^{i-j}$$

$$\exp(j\omega_2 t)^{2k+i+j-4}$$

and can be similarly expressed as $$(a_1(t)\cos(\omega_1 t) + a_2(t)\cos(\omega_2 t))^4$$

$$= \frac{1}{16}\sum_{i=0}^{4}\sum_{j=0}^{4-i}\sum_{k=0}^{4-i-j}\binom{4}{ijk}(a_1(t)\exp(j\omega_1 t))^j(a_1(t)\exp(-j\omega_1 t))^i$$

$$(a_2(t)\exp(j\omega_2 t))^{4-i-j-k}(a_2(t)\exp(-j\omega_2 t))^k$$

$$= \frac{1}{16}\sum_{i=0}^{4}\sum_{j=0}^{4-i}\sum_{k=0}^{4-i-j}\binom{4}{ijk}(a_1(t))^{i+j}(a_2(t))^{4-i-j}\exp(j\omega_1 t)^j$$

$$\exp(-j\omega_1 t)^i \exp(j\omega_2 t)^{4-i-j-k}\exp(-j\omega_2 t)^k$$

$$= \frac{1}{16}\sum_{i=0}^{4}\sum_{j=0}^{4-i}\sum_{k=0}^{4-i-j}\binom{4}{ijk}(a_1(t))^{i+j}(a_2(t))^{4-i-j}$$

$$\exp(j\omega_1 t)^{j-i}\exp(j\omega_2 t)^{4-i-j-2k}$$

Summing the two expressions and dividing by two yields $$(a_1(t)\cos(\omega_1 t) + a_2(t)\cos(\omega_2 t))^4$$

$$= \frac{1}{32}\sum_{i=0}^{4}\sum_{j=0}^{4-i}\sum_{k=0}^{4-i-j}\binom{4}{ijk}(a_1(t))^{i+j}(a_2(t))^{4-i-j}(\exp(j\omega_1 t)^{i-j}$$

$$\exp(j\omega_2 t)^{2k+i+j-4} + \exp(j\omega_1 t)^{j-i}\exp(j\omega_2 t)^{4-i-j-2k})$$

$$= \frac{1}{16}\sum_{i=0}^{4}\sum_{j=0}^{4-i}\sum_{k=0}^{4-i-j}\binom{4}{ijk}(a_1(t))^{i+j}(a_2(t))^{4-i-j}$$

$$\cos(((i-j)\omega_1 + (2k+i+j-4)\omega_2)t)$$

Performing the summation and combining terms yields the following expansion:

$$(a_1(t)\cos(\omega_1 t)+a_2(t)\cos(\omega_2 t))^4=0.125(a_1(t))^4\cos(4\omega_1 t)+0.125(a_2(t))^4\cos(4\omega_2 t)+0.5(a_1(t))^3 a_2(t)\cos((3\omega_1-\omega_2)t)+0.5a_1(t)(a_2(t))^3\cos((\omega_1-3\omega_2)t)+0.5(a_1(t))^3 a_2(t)\cos((3\omega_1+\omega_2)t)+0.5a_1(t)(a_2(t))^3\cos((\omega_1+3\omega_2)t)+0.75(a_1(t))_2(a_2(t))^2\cos((2\omega_1-2\omega_2)t)+0.75(a_1(t))^2(a_2(t))^2\cos((2\omega_1+2\omega_2)t)+1.5((a_1(t))^3 a_2(t)+a_1(t)(a_3(t))^3)\cos((\omega_1-\omega_2)t)+1.5((a_1(t))^3 a_2(t)+a_1(t)(a_3(t))^3)\cos((\omega_1+\omega_2)t)+(0.5(a_1(t))^4+1.5(a_1(t))^2(a_2(t))^2)\cos 2\omega_1 t)+(0.5(a_2(t))^4+1.5(a_1(t))^2(a_2(t))^2)\cos(2\omega_2 t)+0.375(a_1(t))^4+1.5(a_1(t))^2(a_2(t))^2+0.375(a_2(t))^4$$

The harmonics and IM products which result from the expansion can be found in Table 2, below. The terms noted with an asterisk (direct current terms are excluded), namely IM #'s 9-16, have typically not been included in co-existence studies. However, it should be noted that multiplicative coefficients for the noted terms are at least as large as those for the IM terms normally included for the fourth order non-linearity.

The IM terms 13 and 15 at $2*f_1$ and $2*f_2$, respectively, occur also in single carrier operation and may have been addressed previously by allowing for spectral "spreading" when defining spurious exceptions for the second harmonic and also for defining Refsens relaxations for harmonics adjacent to the downlink allocation. This spectral spreading is actually due to an IM term generated by a 4th order (or higher even order) non-linearity falling on to of the second harmonic.

TABLE 2

IM Products and Harmonics due to $4^{th}$ Order Non-linearity

| IM # | Center Frequency | IM Bandwidth | Multiplicative Coefficient |
| --- | --- | --- | --- |
| 1 | $4*f_1$ | $4*W_1$ | 0.125 |
| 2 | $4*f_2$ | $4*W_2$ | 0.125 |
| 3 | $\|3*f_1 - f_2\|$ | $3*W_1 + W_2$ | 0.5 |
| 4 | $\|f_1 - 3*f_2\|$ | $W_1 + 3*W_2$ | 0.5 |
| 5 | $3*f_1 + f_2$ | $3*W_1 + W_2$ | 0.5 |
| 6 | $f_1 + 3*f_2$ | $W_1 + 3*W_2$ | 0.5 |
| 7 | $\|2*f_1 - 2*f_2\|$ | $2*W_1 + 2*W_2$ | 0.75 |
| 8 | $2*f_1 + 2*f_2$ | $2*W_2 + 2*W_1$ | 0.75 |
| 9* | $\|f_1 - f_2\|$ | $3*W_1 + W_2$ | 1.5 |
| 10* | $\|f_1 - f_2\|$ | $W_1 + 3*W_2$ | 1.5 |
| 11* | $f_1 + f_2$ | $3*W_1 + W_2$ | 1.5 |
| 12* | $f_1 + f_2$ | $W_1 + 3*W_2$ | 1.5 |
| 13* | $2*f_1$ | $4*W_1$ | 0.5 |
| 14* | $2*f_1$ | $2*W_1 + 2*W_2$ | 1.5 |
| 15* | $2*f_2$ | $4*W_2$ | 0.5 |
| 16* | $2*f_2$ | $2*W_1 + 2*W_2$ | 1.5 |
| 17 | 0 | $4*W_1$ | 0.375 |
| 18 | 0 | $2*W_1 + 2*W_2$ | 1.5 |
| 19 | 0 | $4*W_2$ | 0.375 |

If the multiplicative coefficient of each term is ignored and the direct current terms are removed, Table 2 can be simplified slightly as in Table 2a below.

TABLE 2a

IM Products and Harmonics due to $4^{th}$ Order Non-linearity

| IM # | Center Frequency | IM Bandwidth |
| --- | --- | --- |
| 1 | $4*f_1$ | $4*W_1$ |
| 2 | $4*f_2$ | $4*W_2$ |
| 3 | $\|3*f_1 - f_2\|$ | $3*W_1 + W_2$ |
| 4 | $\|f_1 - 3*f_2\|$ | $W_1 + 3*W_2$ |
| 5 | $3*f_1 + f_2$ | $3*W_1 + W_2$ |

TABLE 2a-continued

IM Products and Harmonics due to 4$^{th}$ Order Non-linearity

| IM # | Center Frequency | IM Bandwidth |
|---|---|---|
| 6 | $f_1 + 3*f_2$ | $W_1 + 3*W_2$ |
| 7 | $\mid 2*f_1 - 2*f_2 \mid$ | $2*W_1 + 2*W_2$ |
| 8 | $2*f_1 + 2*f_2$ | $2*W_2 + 2*W_1$ |
| 9* | $\mid f_1 - f_2 \mid$ | $\max(3*W_1 + W_2, W_1 + 3*W_2)$ |
| 10* | $f_1 + f_2$ | $\max(3*W_1 + W_2, W_1 + 3*W_2)$ |
| 11* | $2*f_1$ | $\max(4*W_1, 2*W_1 + 2*W_2)$ |
| 12* | $2*f_2$ | $\max(4*W_2, 2*W_1 + 2*W_2)$ |

Fifth Order Nonlinearity Intermodulation Products

The two carrier fifth-order nonlinearity can be represented as:

$$(a_1(t)\cos(\omega_1 t) + a_2(t)\cos(\omega_2 t))^5$$

which expands, as follows:

$$(a_1(t)\cos(\omega_1 t) + a_2(t)\cos(\omega_2 t))^5$$

$$= \left(\frac{1}{2}a_1(t)(\exp(j\omega_1 t) + \exp(-j\omega_1 t)) + \frac{1}{2}a_2(t)(\exp(j\omega_2 t) + \exp(-j\omega_2 t))\right)^5$$

$$= \frac{1}{32}\sum_{i=0}^{5}\sum_{j=0}^{5-i}\sum_{k=0}^{5-i-j}\binom{5}{ijk}(a_1(t)\exp(j\omega_1 t))^i(a_1(t)\exp(-j\omega_1 t))^j$$

$$(a_2(t)\exp(j\omega_2 t))^k(a_2(t)\exp(-j\omega_2 t))^{5-i-j-k}$$

$$= \frac{1}{32}\sum_{i=0}^{5}\sum_{j=0}^{5-i}\sum_{k=0}^{5-i-j}\binom{5}{ijk}(a_1(t))^{i+j}(a_2(t))^{5-i-j}\exp(j\omega_1 t)^i$$

$$\exp(-j\omega_1 t)^j \exp(j\omega_2 t)^k \exp(-j\omega_2 t)^{5-i-j-k}$$

$$= \frac{1}{32}\sum_{i=0}^{5}\sum_{j=0}^{5-i}\sum_{k=0}^{5-i-j}\binom{5}{ijk}(a_1(t))^{i+j}(a_2(t))^{5-i-j}\exp(j\omega_1 t)^{i-j}$$

$$\exp(j\omega_2 t)^{2k+i+j-5}$$

and can similarly be expressed as $$(a_1(t)\cos(\omega_1 t) + a_2(t)\cos(\omega_2 t))^5$$

$$= \frac{1}{32}\sum_{i=0}^{5}\sum_{j=0}^{5-i}\sum_{k=0}^{5-i-j}\binom{5}{ijk}(a_1(t)\exp(j\omega_1 t))^j(a_1(t)\exp(-j\omega_1 t))^i$$

$$(a_2(t)\exp(j\omega_2 t))^{5-i-j-k}(a_2(t)\exp(-j\omega_2 t))^k$$

$$= \frac{1}{32}\sum_{i=0}^{5}\sum_{j=0}^{5-i}\sum_{k=0}^{5-i-j}\binom{5}{ijk}(a_1(t))^{i+j}(a_2(t))^{5-i-j}\exp(j\omega_1 t)^j$$

$$\exp(-j\omega_1 t)^i \exp(j\omega_2 t)^{5-i-j-k}\exp(-j\omega_2 t)^k$$

$$= \frac{1}{32}\sum_{i=0}^{5}\sum_{j=0}^{5-i}\sum_{k=0}^{5-i-j}\binom{5}{ijk}(a_1(t))^{i+j}(a_2(t))^{5-i-j}$$

$$\exp(j\omega_1 t)^{j-i}\exp(j\omega_2 t)^{5-i-j-2k}$$

Summing the two expressions and dividing by two yields $$(a_1(t)\cos(\omega_1 t) + a_2(t)\cos(\omega_2 t))^5$$

$$= \frac{1}{64}\sum_{i=0}^{5}\sum_{j=0}^{5-i}\sum_{k=0}^{5-i-j}\binom{5}{ijk}(a_1(t))^{i+j}(a_2(t))^{5-i-j}(\exp(j\omega_1 t)^{i-j}$$

$$\exp(j\omega_2 t)^{2k+i+j-5} + \exp(j\omega_1 t)^{j-i}\exp(j\omega_2 t)^{5-i-j-2k})$$

$$= \frac{1}{32}\sum_{i=0}^{5}\sum_{j=0}^{5-i}\sum_{k=0}^{5-i-j}\binom{5}{ijk}(a_1(t))^{i+j}(a_2(t))^{5-i-j}$$

$$\cos(((i-j)\omega_1 + (2k+i+j-5)\omega_2)t)$$

Performing the summation and combining terms yields the following expansion:

$(a_1(t)\cos(\omega_1 t) + a_2(t)\cos(\omega_2 t))^5 = 0.0625(a_1(t))^5 \cos(5\omega_1 t) + 0.3125(a_1(t))^4 a_2(t)\cos((4\omega_1 - \omega_2)t) + 0.3125(a_1(t))^4 a_2(t)\cos((4\omega_1 + \omega_2)t) + 0.625(a_1(t))^3 (a_2(t))^2 \cos((3\omega_1 - 2\omega_2)t) + 0.625(a_1(t))^3 (a_2(t))^2 \cos((3\omega_1 + 2\omega_2)t) + 0.625(a_1(t))^2 (a_2(t))^3 \cos(3\omega_2 - 2\omega_1)t) + 0.625(a_1(t))^2 (a_2(t))^3 \cos(3\omega_2 + 2\omega_1)t) + 0.3125 a_1(t)(a_2(t))^4 \cos((4\omega_2 - \omega_1)t) + 0.3125 a_1(t)(a_2(t))^4 \cos((4\omega_2 + \omega_1)t) + 0.0625(a_2(t))^5 \cos(5\omega_2 t) + (0.3125(a_1(t))^5 + 1.25(a_1(t))^3 (a_2(t))^2)\cos(3\omega_1 t) + (1.25(a_1(t))^4 a_2(t) + 1.875(a_1(t))^2 (a_2(t))^3)\cos((2\omega_1 - \omega_2)t) + (1.25(a_1(t))^4 a_2(t) + 1.875(a_1(t))^2 (a_2(t))^3)\cos((2\omega_1 + \omega_2)t) + (1.875(a_1(t))^3 (a_2(t))^2 + 1.25 a_1(t)(a_2(t))^4)\cos((2\omega_2 - \omega_1)t) + (1.875(a_1(t))^3 (a_2(t))^2 + 1.25 a_1(t)(a_2(t))^4)\cos((2\omega_2 + \omega_1)t) + (1.25(a_1(t))^2 (a_2(t))^3 + 0.3125(a_2(t))^5)\cos(3\omega_2 t) + (0.625(a_1(t))^5 + 3.75(a_1(t))^3 (a_2(t))^2 + 1.875 a_1(t)(a_2(t))^4)\cos(\omega_1 t) + (1.875(a_1(t))^4 a_2(t) + 3.75(a_1(t))^2 (a_2(t))^3 + 0.625(a_2(t)^5)\cos(\omega_2 t)$ The harmonics and IM products which result from the expansion can be found in Table 3, below. The terms noted with an asterisk, namely IM #'s 11-28, have typically not been included in co-existence studies. However, it should be noted that multiplicative coefficients for the noted terms are at least as large as those for the IM terms normally included for the fifth order non-linearity.

The IM terms 11 and 13 at $3*f_1$ and $3*f_2$, respectively, occur also in single carrier operation and have been addressed previously by allowing for spectral "spreading" when defining spurious exceptions for the third harmonic and also for defining Refsens relaxations for harmonics adjacent to the downlink allocation. This spectral spreading is actually due to an IM term generated by a 5$^{th}$ order (or higher odd order) non-linearity falling on top of the third harmonic.

TABLE 3

IM Products and Harmonics due to 5$^{nd}$ Order Non-linearity

| IM # | Center Frequency | IM Bandwidth | Multiplicative Coefficient |
|---|---|---|---|
| 1 | $5*f_1$ | $5*W_1$ | 0.0625 |
| 2 | $5*f_2$ | $5*W_2$ | 0.0625 |
| 3 | $\mid 4*f_1 - f_2 \mid$ | $4*W_1 + W_2$ | 0.3125 |
| 4 | $\mid f_1 - 4*f_2 \mid$ | $W_1 + 4*W_2$ | 0.3125 |
| 5 | $4*f_1 + f_2$ | $4*W_1 + W_2$ | 0.3125 |
| 6 | $f_1 + 4*f_2$ | $W_1 + 4*W_2$ | 0.3125 |
| 7 | $\mid 3*f_1 - 2*f_2 \mid$ | $3*W_1 + 2*W_2$ | 0.625 |
| 8 | $\mid 2*f_1 - 3*f_2 \mid$ | $2*W_2 + 3*W_1$ | 0.625 |
| 9 | $3*f_1 + 2*f_2$ | $3*W_1 + 2*W_2$ | 0.625 |
| 10 | $2*f_1 + 3*f_2$ | $2*W_2 + 3*W_1$ | 0.625 |
| 11* | $3*f_1$ | $5*W_1$ | 0.3125 |
| 12* | $3*f_1$ | $3*W_1 + 2*W_2$ | 1.25 |

TABLE 3-continued

IM Products and Harmonics due to $5^{nd}$ Order Non-linearity

| IM # | Center Frequency | IM Bandwidth | Multiplicative Coefficient |
| --- | --- | --- | --- |
| 13* | $3*f_2$ | $5*W_2$ | 0.3125 |
| 14* | $3*f_2$ | $2*W_1 + 3*W_2$ | 1.25 |
| 15* | $\|2*f_1 - f_2\|$ | $4*W_1 + W_2$ | 1.25 |
| 16* | $\|2*f_1 - f_2\|$ | $2*W_1 + 3*W_2$ | 1.875 |
| 17* | $\|f_1 - 2*f_2\|$ | $W_1 + 4*W_2$ | 1.25 |
| 18* | $\|f_1 - 2*f_2\|$ | $3*W_1 + 2*W_2$ | 1.875 |
| 19* | $2*f_1 + f_2$ | $4*W_1 + W_2$ | 1.25 |
| 20* | $2*f_1 + f_2$ | $2*W_1 + 3*W_2$ | 1.875 |
| 21* | $f_1 + 2*f_2$ | $W_1 + 4*W_2$ | 1.25 |
| 22* | $f_1 + 2*f_2$ | $3*W_1 + 2*W_2$ | 1.875 |
| 23* | $f_1$ | $5*W_1$ | 0.625 |
| 24* | $f_1$ | $3*W_1 + 2*W_2$ | 3.75 |
| 25* | $f_1$ | $W_1 + 4*W_2$ | 1.875 |
| 26* | $f_2$ | $5*W_2$ | 0.625 |
| 27* | $f_2$ | $2*W_1 + 3*W_2$ | 3.75 |
| 28* | $f_2$ | $4*W_1 + W_2$ | 1.875 |

If the multiplicative coefficient of each term is ignored, Table 3 can be simplified slightly as in Table 3a below.

TABLE 3a

IM Products and Harmonics due to $5^{nd}$ Order Non-linearity

| IM # | Center Frequency | IM Bandwidth |
| --- | --- | --- |
| 1 | $5*f_1$ | $5*W_1$ |
| 2 | $5*f_2$ | $5*W_2$ |
| 3 | $\|4*f_1 - f_2\|$ | $4*W_1 + W_2$ |
| 4 | $\|f_1 - 4*f_2\|$ | $W_1 + 4*W_2$ |
| 5 | $4*f_1 + f_2$ | $4*W_1 + W_2$ |
| 6 | $f_1 + 4*f_2$ | $W_1 + 4*W_2$ |
| 7 | $\|3*f_1 - 2*f_2\|$ | $3*W_1 + 2*W_2$ |
| 8 | $\|2*f_1 - 3*f_2\|$ | $2*W_2 + 3*W_1$ |
| 9 | $3*f_1 + 2*f_2$ | $3*W_1 + 2*W_2$ |
| 10 | $2*f_1 + 3*f_2$ | $2*W_2 + 3*W_1$ |
| 11* | $3*f_1$ | $\max(5*W_1, 3*W_1 + 2*W_2)$ |
| 12* | $3*f_2$ | $\max(5*W_2, 2*W_1 + 3*W_2)$ |
| 13* | $\|2*f_1 - f_2\|$ | $\max(4*W_1 + W_2, 2*W_1 + 3*W_2)$ |
| 14* | $\|f_1 - 2*f_2\|$ | $\max(W_1 + 4*W_2, 3*W_1 + 2*W_2)$ |
| 15* | $2*f_1 + f_2$ | $\max(4*W_1 + W_2, 2*W_1 + 3*W_2)$ |
| 16* | $f_1 + 2*f_2$ | $\max(W_1 + 4*W_2, 3*W_1 + 2*W_2)$ |
| 17* | $f_1$ | $\max(5*W_1, 3*W_1 + 2*W_2, W_1 + 4*W_2)$ |
| 18* | $f_2$ | $\max(5*W_2, 2*W_1 + 3*W_2, 4*W_1 + W_2)$ |

As such, the two-carrier third, fourth and fifth order nonlinearities have been expanded in order to enumerate the intermodulation terms and harmonics resulting from these nonlinearities. Recent co-existence studies for NSA NR have generally not included the IM products generated by higher order non-linearities which fall on top of IM products generated by lower order non-linearities. However, as these co-located higher order IM products may have more power than the higher order IM products which are not co-located with lower order IM's, they should also be included in the NSA NR co-existence studies. Thus, it would be beneficial for the noted IM products in Tables 1, 2, and 3 be considered for inclusion in the dual-carrier self-defense analysis, such as for non-standalone (NSA) fifth generation (5G) standards, and corresponding reference sensitivity relaxations be defined, if necessary, including where the IM products fall in a downlink allocation.

Figure 2:
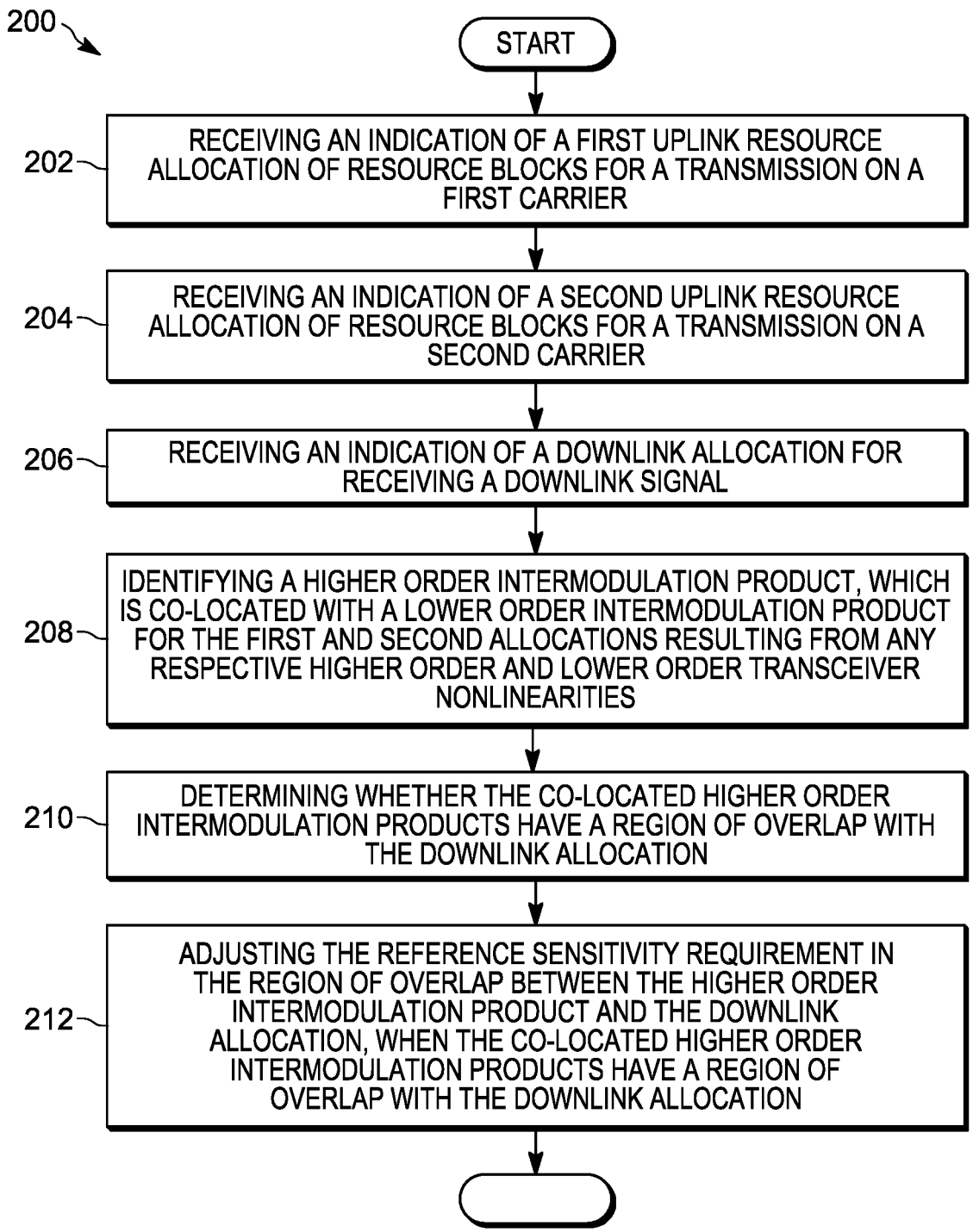
FIG. 2 is a flow diagram in a user equipment for adjusting reference sensitivity requirement when higher order intermodulation products, which are co-located with lower order intermodulation products, overlap with a downlink allocation.

FIG. 2 illustrates a flow diagram 200 in a user equipment for adjusting reference sensitivity requirement when higher order intermodulation products, which are co-located with lower order intermodulation products overlap with a downlink allocation. More specifically, the flow diagram 200 is illustrative of a method, and includes receiving 202 an indication of a first uplink resource allocation of resource blocks for a transmission on a first carrier, and receiving 204 an indication of a second uplink resource allocation of resource blocks for a transmission on a second carrier. An indication of a downlink allocation for receiving a downlink signal is further received 206. A higher order intermodulation product, which is co-located with a lower order intermodulation product for the first and second allocations resulting from any respective higher order and lower order transceiver nonlinearities is identified 208. A determination 210 is then made as to whether the co-located higher order intermodulation products have a region of overlap with the downlink allocation. When the co-located higher order intermodulation products have a region of overlap with the downlink allocation, the reference sensitivity requirement in the region of overlap between the higher order intermodulation product and the downlink allocation is adjusted 212.

A method consistent with flow diagram 200 illustrated in FIG. 2 can further provide for where adjusting the reference sensitivity requirement in the region of overlap between the higher intermodulation product and the downlink allocation includes relaxing the reference sensitivity. In some instances, an amount that the reference sensitivity is relaxed can correspond to an amount of the noise rise in a receiver of the user equipment resulting from the higher order intermodulation product. In some instances, adjusting the reference sensitivity requirement in the region of overlap between the higher intermodulation product and the downlink allocation can include a suspension of the reference sensitivity requirement.

In some instances, the lower order intermodulation product can correspond to a second order intermodulation product and the higher order intermodulation product can correspond to a fourth order intermodulation product. In some instances, the lower order intermodulation product can correspond to a third order intermodulation product and the higher order intermodulation product can correspond to a fifth order intermodulation product. In some instances, the higher order intermodulation product can be two orders higher than the lower order intermodulation product. In some instances, a difference in an order of the lower order intermodulation product and an order of the higher order intermodulation product can be an even number.

In some instances, determining whether the co-located higher order intermodulation products have a region of overlap with the downlink allocation can include instances where the lower order intermodulation products do not have a region of overlap with the downlink allocation.

In some instances, the transmission on the first carrier and the transmission on the second carrier can support carrier aggregation, which includes a combination of different spectrum bands to form a larger channel to transmit data. In some instances, the transmission on the first carrier and the transmission on the second carrier can support dual carrier operation.

Figure 3:
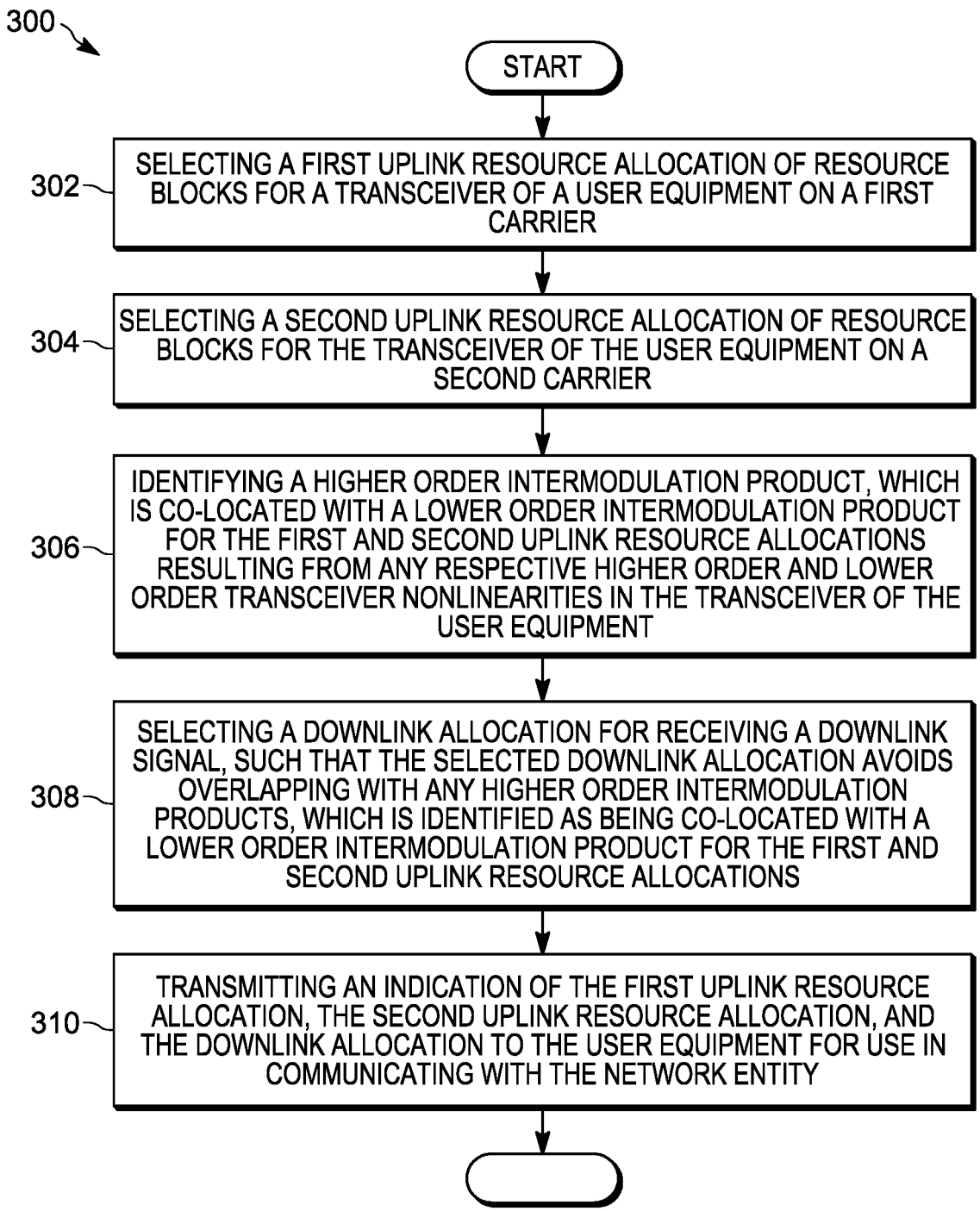
FIG. 3 is a flow diagram in a network entity for selecting a downlink allocation for use by a user equipment for receiving a downlink signal, which avoids overlap with higher order intermodulation products that are co-located with lower order intermodulation products.

FIG. 3 is a flow diagram 300 in a network entity for selecting a downlink allocation for use by a user equipment for receiving a downlink signal, which avoids overlap with higher order intermodulation products that are co-located with lower order intermodulation products. The flow diagram 300 is similarly illustrative of a method. The flow diagram 300 includes selecting 302 a first uplink resource allocation of resource blocks for a transceiver of a user equipment on a first carrier, and selecting 304 a second uplink resource allocation of resource blocks for the transceiver of the user equipment on a second carrier. A higher order intermodulation product, which is co-located with a lower order intermodulation product for the first and second uplink resource allocations resulting from any respective higher order and lower order transceiver nonlinearities in the transceiver of the user equipment is then identified 306. A downlink allocation for receiving a downlink signal is then selected 308, such that the selected downlink allocation avoids overlapping with any higher order intermodulation products, which is identified as being co-located with a lower order intermodulation product for the first and second uplink resource allocations. An indication of the first uplink resource allocation, the second uplink resource allocation, and the downlink allocation is then transmitted 310 to the user equipment for use in communicating with the network entity.

Figure 4:
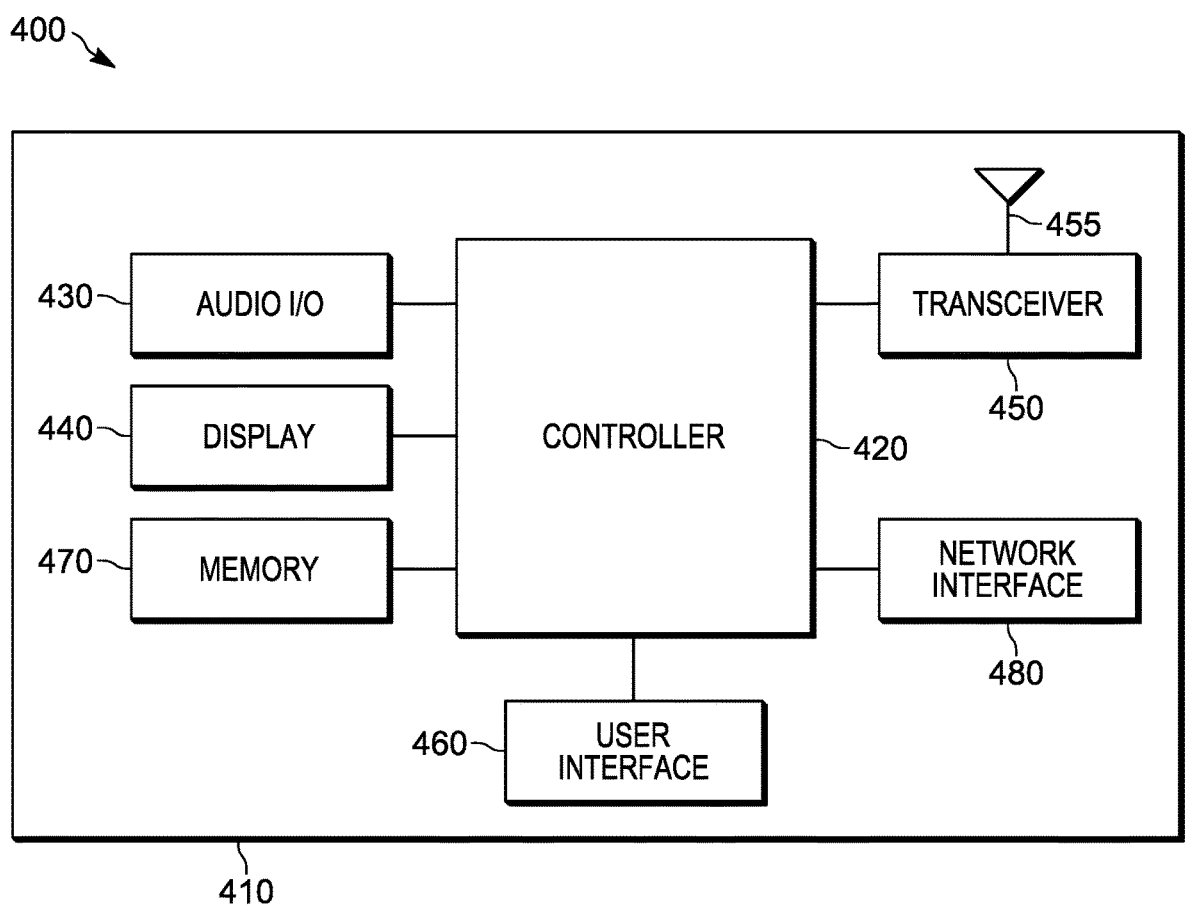
FIG. 4 is an exemplary block diagram of an apparatus according to a possible embodiment.

FIG. 4 is an exemplary block diagram of an apparatus 400, such as the wireless communication device 110, according to a possible embodiment. The apparatus 400 can include a housing 410, a controller 420 within the housing 410, audio input and output circuitry 430 coupled to the controller 420, a display 440 coupled to the controller 420, a transceiver 450 coupled to the controller 420, an antenna 455 coupled to the transceiver 450, a user interface 460 coupled to the controller 420, a memory 470 coupled to the controller 420, and a network interface 480 coupled to the controller 420. The apparatus 400 can perform the methods described in all the embodiments The display 440 can be a viewfinder, a liquid crystal display (LCD), a light emitting diode (LED) display, a plasma display, a projection display, a touch screen, or any other device that displays information. The transceiver 450 can include a transmitter and/or a receiver. The audio input and output circuitry 430 can include a microphone, a speaker, a transducer, or any other audio input and output circuitry. The user interface 460 can include a keypad, a keyboard, buttons, a touch pad, a joystick, a touch screen display, another additional display, or any other device useful for providing an interface between a user and an electronic device. The network interface 480 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 470 can include a random access memory, a read only memory, an optical memory, a solid state memory, a flash memory, a removable memory, a hard drive, a cache, or any other memory that can be coupled to an apparatus.

The apparatus 400 or the controller 420 may implement any operating system, such as Microsoft Windows®, UNIX®, or LINUX®, Android, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 470 or elsewhere on the apparatus 400. The apparatus 400 or the controller 420 may also use hardware to implement disclosed operations. For example, the controller 420 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 420 may be any controller or processor device or devices capable of operating an apparatus and implementing the disclosed embodiments. Some or all of the additional elements of the apparatus 400 can also perform some or all of the operations of the disclosed embodiments.

The flow diagrams and/or methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first", "second", and the like may be used solely to distinguish one entity or action from another entity or action without necessarily requiring or implying any actual such relationship or order between such entities or actions. The phrase "at least one of", "at least one selected from the group of", or "at least one selected from" followed by a list is defined to mean one, some, or all, but not necessarily all of, the elements in the list. The terms "comprises", "comprising", "including", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that comprises the element. Also, the term "another" is defined as at least a second or more. The terms "including", "having", and the like, as used herein, are defined as "comprising". Furthermore, the background section is written as the inventor's own understanding of the context of some embodiments at the time of filing and includes the inventor's own recognition of any problems with existing technologies and/or problems experienced in the inventor's own work.

What is claimed is:

1. A method performed by a user equipment (UE), the method comprising:
   receiving an indication of a first uplink resource allocation of resource blocks for a transmission on a first carrier;

receiving an indication of a second uplink resource allocation of resource blocks for a transmission on a second carrier, wherein the second carrier is different from the first carrier;

receiving an indication of a downlink allocation for receiving a downlink signal;

identifying a higher order intermodulation product for the first uplink resource allocation and the second uplink resource allocation, the higher order intermodulation product being co-located with a lower order intermodulation product for the first uplink resource allocation and the second uplink resource allocation and resulting from any respective higher order and lower order transceiver nonlinearities, wherein a frequency in a bandwidth of the higher order intermodulation product falls on top of a frequency in a bandwidth of the lower order intermodulation product; and adjusting, based on the higher order intermodulation product having a region of overlap with the downlink allocation, a reference sensitivity requirement in the region of overlap between the higher order intermodulation product and the downlink allocation.

2. The method of claim 1, wherein the bandwidth of the higher order intermodulation product includes more spectral spreading than the bandwidth of the lower order intermodulation product.

3. The method of claim 1, further comprising determining a coefficient value of the higher order intermodulation product that is co-located with the lower order intermodulation product, wherein adjusting the reference sensitivity requirement in the region of overlap is based at least in part on the coefficient value.

4. The method of claim 3, wherein adjusting the reference sensitivity requirement in the region of overlap is based on the coefficient value being equal to or greater than one or more coefficient values of other intermodulation products.

5. The method of claim 1, wherein adjusting the reference sensitivity requirement in the region of overlap comprises relaxing the reference sensitivity requirement, wherein an amount that the reference sensitivity requirement is relaxed corresponds to an increase in noise in a receiver of the UE resulting from the higher order intermodulation product.

6. The method of claim 1, wherein adjusting the reference sensitivity requirement in the region of overlap comprises a suspension of the reference sensitivity requirement.

7. The method of claim 1, further comprising determining an order of the higher order intermodulation product that is co-located with the lower order intermodulation product, wherein adjusting the reference sensitivity requirement in the region of overlap is based at least in part on the order of the higher order intermodulation product.

8. The method of claim 1, wherein a difference in an order of the lower order intermodulation product and an order of the higher order intermodulation product is an even number.

9. The method of claim 1, further comprising determining the higher order intermodulation product has the region of overlap with the downlink allocation, wherein there are instances where the lower order intermodulation product does not have the region of overlap with the downlink allocation.

10. The method of claim 1, wherein the transmission on the first carrier and the transmission on the second carrier support carrier aggregation.

11. The method of claim 1, wherein the transmission on the first carrier and the transmission on the second carrier support dual carrier operation.

12. A user equipment (UE) for wireless communication, comprising:

at least one memory; and at least one processor coupled with the at least one memory and configured to cause the UE to:

receive an indication of a first uplink resource allocation of resource blocks for a transmission on a first carrier;

receive an indication of a second uplink resource allocation of resource blocks for a transmission on a second carrier, wherein the second carrier is different from the first carrier;

receive an indication of a downlink allocation for receiving a downlink signal;

identify a higher order intermodulation product for the first uplink resource allocation and the second uplink resource allocation, the higher order intermodulation product being co-located with a lower order intermodulation product for the first uplink resource allocation and the second uplink resource allocation and resulting from any respective higher order and lower order transceiver nonlinearities, wherein a frequency in a bandwidth of the higher order intermodulation product falls on top of a frequency in a bandwidth of the lower order intermodulation product; and adjust, based on the higher order intermodulation product having a region of overlap with the downlink allocation, a reference sensitivity requirement in the region of overlap between the higher order intermodulation product and the downlink allocation.

13. The UE of claim 12, wherein the bandwidth of the higher order intermodulation product includes more spectral spreading than the bandwidth of the lower order intermodulation product.

14. The UE of claim 12, wherein the at least one processor is further configured to cause the UE to determine a coefficient value of the higher order intermodulation product that is co-located with the lower order intermodulation product, wherein adjusting the reference sensitivity requirement in the region of overlap is based at least in part on the coefficient value.

15. The UE of claim 14, wherein adjusting the reference sensitivity requirement in the region of overlap is based on the coefficient value being equal to or greater than one or more coefficient values of other intermodulation products.

16. The UE of claim 12, wherein to adjust the reference sensitivity requirement in the region of overlap the at least one processor is configured to cause the UE to relax the reference sensitivity requirement, and wherein an amount that the reference sensitivity requirement is relaxed, corresponds to an increase in noise in a receiver of the UE resulting from the higher order intermodulation product.

17. The UE of claim 12, wherein to adjust the reference sensitivity requirement in the region of overlap the at least one processor is configured to cause the UE to suspend the reference sensitivity requirement.

18. The UE of claim 12, wherein the at least one processor is further configured to cause the UE to determine an order of the higher order intermodulation product that is co-located with the lower order intermodulation product, wherein adjusting the reference sensitivity requirement in the region of overlap is based at least in part on the order of the higher order intermodulation product.

19. The UE of claim 12, wherein a difference in a rank of the lower order intermodulation product and a rank of the higher order intermodulation product is an even number.

20. The UE of claim 12, wherein the at least one processor is further configured to cause the UE to determine the higher order intermodulation product has the region of overlap with the downlink allocation, wherein there are instances where the lower order intermodulation product does not have the region of overlap with the downlink allocation.

21. A method performed by a network entity, the method comprising:
    transmitting an indication of a first uplink resource allocation of resource blocks for uplink on a first carrier;
    transmitting an indication of a second uplink resource allocation of resource blocks for uplink on a second carrier, wherein the second carrier is different from the first carrier;
    transmitting an indication of a downlink allocation for downlink; and
    identifying a higher order intermodulation product being co-located with a lower order intermodulation product, wherein a frequency in a bandwidth of the higher order intermodulation product falls on top of a frequency in a bandwidth of the lower order intermodulation product, and wherein the higher order intermodulation product has a region of overlap with the downlink allocation.

22. A network entity for wireless communication, comprising:
    at least one memory; and
    at least one processor coupled with the at least one memory and configured to cause the network entity to:
        transmit an indication of a first uplink resource allocation of resource blocks for uplink on a first carrier;
        transmit an indication of a second uplink resource allocation of resource blocks for uplink on a second carrier, wherein the second carrier is different from the first carrier;
        transmit an indication of a downlink allocation for downlink; and
        identify a higher order intermodulation product being co-located with a lower order intermodulation product, wherein a frequency in a bandwidth of the higher order intermodulation product falls on top of a frequency in a bandwidth of the lower order intermodulation product, and wherein the higher order intermodulation product has a region of overlap with the downlink allocation.

* * * * *